Oct. 4, 1927.
W. C. BRINTON JR
1,644,234
GREASE CUP
Filed Nov. 17, 1924
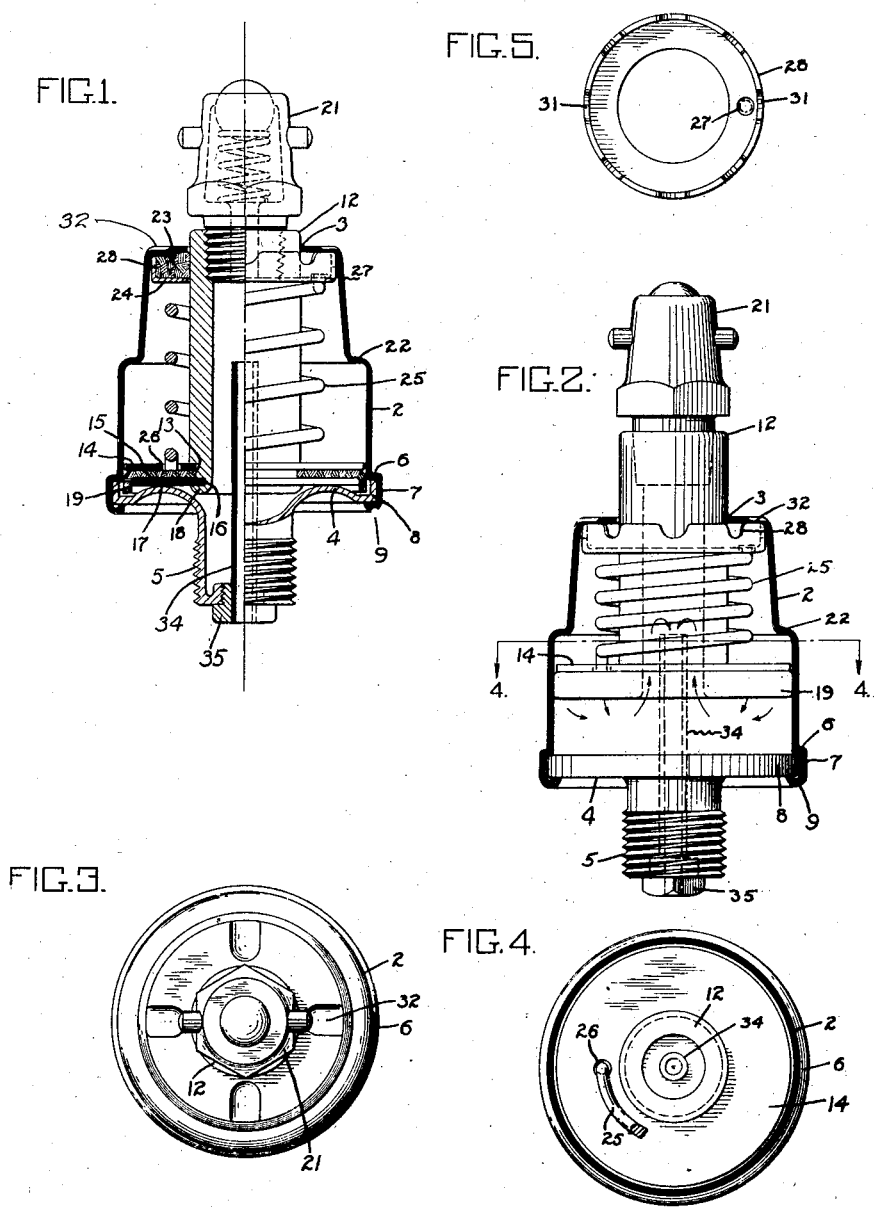
INVENTOR
WILLIAM C. BRINTON JR.
or White Prost Evans
HIS ATTORNEYS.

Patented Oct. 4, 1927.

1,644,234

UNITED STATES PATENT OFFICE.

WILLIAM C. BRINTON, JR., OF LARKSPUR, CALIFORNIA, ASSIGNOR TO THE GREASOMETER CORPORATION, OF SAN FRANCISCO, CALIFORNIA, A CORPORATION OF CALIFORNIA.

GREASE CUP.

Application filed November 17, 1924. Serial No. 750,381.

The invention relates to force feed grease cups, sometimes known as automatic grease cups, into which a charge of grease is introduced under pressure and in which the charge of grease is maintained under pressure, whereby the grease is slowly expelled to the bearing or other instrumentality to be lubricated. The prime function of an automatic device is that it remains automatic during continued use, since it is relied upon to function automatically and is not given the attention that would be given to a manually operated device. A person using automatic grease cups on his automobile, relies upon these cups to keep the bearings properly lubricated and, if the grease cups do not function properly the bearings will suffer from lack of lubrication.

An object of the present invention, therefore, is to provide an automatic grease cup which will continue to function automatically during long periods of use.

When grease is maintained under pressure, the lighter oils forming part of the grease are gradually expelled from the body of grease, so that in time the body of grease becomes very stiff and practically solid, so that it is not ejected through the small outlet aperture. The grease cup may be fully charged with grease, but on account of the substantially solid nature of this body of dead grease, no grease is being expelled from the cup and consequently no grease is being applied to the bearing. Grease cups of the general nature disclosed herein are usually constructed to indicate when the cup contains a charge of grease and the user is justified in believing that when the cup is charged it is properly fulfilling its functions to lubricate the bearing. Due to the fact, however, that the grease becomes very hard and stiff, the fact that the grease cup is charged with grease is no indication that grease is being discharged from the cup and the user of the grease cup is misled, with the resultant destruction or deterioration of the bearing. In many force feed or automatic grease cups, the entire charge of grease is not expelled from the cup and a large amount of grease remains in the cup between the pressure applying means and the outlet aperture. This grease gradually becomes more stiff so that it may not be expelled from the grease cup by the pressure means and, since this dead grease lies between the pressure means and the outlet orifice, the introduction of fresh grease into the cup, behind the body of dead grease, is futile to lubrication, since the body of dead grease prevents the fresh grease from reaching the discharge outlet. The fresh grease rapidly loses its lighter oils, with the result that it soon becomes a hard substantially solid body so that the cup is fully charged with dead grease, which cannot be ejected from the cup by the pressure means. The cup will indicate that it is fully charged with grease, the intent of the indication being to assure the user that the bearing is being supplied with grease, but the indication is false, since no grease is being ejected from the cup.

An object of the present invention, therefore, is to provide a grease cup in which a charge of dead grease does not accumulate around or in front of the discharge outlet, so that grease will be continuously discharged from the cup as long as there is a charge of grease therein. This is accomplished by extending the discharge outlet to the active grease space in the cup, that is, the space from which grease is displaced by the movement of the pressure applying means and into which grease is introduced when a fresh charge of grease is introduced into the cup. The introduction of the fresh charge serves to remove any old grease from adjacent the discharge outlet and mix the old grease with the fresh grease, so that the grease is always free and in condition to discharge from the cup, under the action of the pressure means within the cup.

In order to control the slow discharge of grease from automatic grease cups, these cups have heretofore been usually provided with a very small outlet orifice, through which the grease is discharged very slowly. This orifice is extremely fine and may be readily clogged to prevent the discharge of grease. Further, when the grease becomes stiff it will not discharge through the very small orifice under the pressure existing within the cup. In accordance with my invention, I have provided a discharge tube having an elongated smooth bore of small diameter, through which the grease discharges from the cup. The diameter of the tube is many times the diameter of the orifice heretofore used, so that the liability of clogging is reduced to a minimum. The rate at which the grease discharges from the cup is controlled by the length of the tube, since the resistance to the flow of grease through the tube varies with the length of the tube. A further object of my invention, therefore, is to provide a grease cup having an outlet of relatively large diameter through which the grease may continually pass and through which the flow of grease is controlled, so that grease is discharged from the cup at the desired rate.

Automatic grease cups are usually provided with a fitting adapted to receive a complementary fitting on the end of the flexible conduit, through which grease is discharged under pressure from a grease gun. During the use of the grease gun, the conduit is frequently rotated or twisted, throwing a strain on the fitting on the cup. This fitting is sometimes made non-rotatable and when a strain is thrown upon it the cup is frequently injured or broken. On the other hand, they are sometimes made fully rotatable. The fitting, however, should not be fully rotatable, since under this condition the application of the flexible conduit thereto would be difficult. In accordance with my invention, I provide a fitting which is rotatable upon the application of pressure thereto, means being provided, however, for yieldingly resisting the rotation. The fitting is therefore normally held stationary, but when a strain is placed thereon, as frequently happens in operating the grease gun, the fitting will rotate, preventing the application of deleterious strains to the grease cup. The fitting is sometimes attached to a plunger which is slidable through an opening in the end of the cup, the plunger and opening being sometimes polygonal and fitting fairly tight, so that the plunger may not be rotated with respect to the cup. The pressure on the grease in the cup causes the separation of the light oil from the grease and this oil finds its way out through the joints between the plunger and the cup. This oil gathers dirt so that frequently the plunger is sealed to the cup, the seal being so strong that it is not broken by the pressure means within the cup, because a partial vacuum is formed above the piston. Under these circumstances the cup will not function to eject grease. This seal may not be readily broken, since the plunger is not rotatable with respect to the cup. In accordance with my invention, the plunger is cylindrical and the hole in the casing is circular, so that the plunger may be rotated with respect to the cup to break the seal which may form due to the accumulation of dirt, so that the plunger is free to move to eject grease from the cup.

The invention possesses other advantageous features, some of which with the foregoing, will be set forth at length in the following description, where I shall outline in full that form of my invention which I have selected for illustration in the drawings accompanying and forming part of the present specification. In said drawings I have shown one form of grease cup embodying my invention, but it is to be understood that I do not limit myself to such form, since the invention, as set forth in the claims, may be embodied in a plurality of forms.

Referring to said drawings:

Figure 1 is a vertical section through a grease cup embodying my invention, the lines of section being taken on different planes to fully illustrate the construction. In this figure the grease expelling piston is shown in extended position.

Figure 2 is a vertical section through the cup, the remaining parts of the device being shown in full, and the piston being shown in partially retracted position.

Figure 3 is a top view of the cup shown in Figure 1.

Figure 4 is a cross section taken on the line 4—4 Figure 2.

Figure 5 is a top view of the packing ring forming part of the device.

The device of my invention, which is shown at substantially twice actual size, in the drawings, comprises a metallic body member or shell 2 having a circular aperture 3 in one end and being closed at the other end by a cap or base member 4 carrying a threaded mounting stem 5 for screwing the cup into the bearing. I shall refer to the end of the shell having the aperture 3 therein as the upper end of the shell and the end to which the cap 4 is secured as the lower end of the shell. The shell is provided adjacent its lower end with a shoulder 6 interposed between the body of the shell and the skirt 7. The cap or base member 4 is provided with a peripheral flange 8 which bears at its edge against the shoulder 6 and which forms a tight contact with the skirt 7. In assembling the device, the cap 4 is placed within the skirt 7 and then pressure is exerted inward radially on the skirt 7 to bring it into tight contact with the flange 8 of the cap and then the edge 9 of the skirt is curled over into tight contact with the marginal portion of the cap, forming a hermetic or substantially hermetic seal. The outer face of the skirt 7 is preferably knurled to facilitate screwing the mounting stem into the bearing.

Extending through the hole 3 in the upper end of the shell is a hollow cylindrical stem 12 which forms a rotatable fit with the shell. Secured to the lower end of the stem and disposed within the shell is a piston against which pressure is exerted to force the grease from the shell. Formed on the lower end of the stem is an annular shoulder 13 on which is fitted a metallic washer 14 and a cup leather 15. Below the shoulder 13 there is formed an annular shoulder 16 of lesser diameter than the shoulder 13 and fitted against the shoulder 16 is a metallic washer 17. The two washers 14 and 17 and the interposed cup leather 15 constitute the piston for ejecting the grease from the cup. The piston is secured in place on the stem by curling over the lower edge 18 of the stem against the lower face of the washer 17. The shoulder 13 is of such length with respect to the thickness of the washer 14 and the cup leather 15, that the cup leather is subjected only to the desired pressure. When the end 18 of the stem is curled over, the pressure on the washer 17 is the same in all devices. The cup leather is provided on its outer end with a down-turned skirt 19 and means are provided for preventing the edge of the skirt from coming in contact with the cap 4 when the piston is in fully extended position. By fully extended position, I mean the ultimate position to which the piston is moved by the pressure means. When grease is introduced into the shell the piston is moved to retracted position and is gradually moved toward extended position by the pressure means. The cap 4 is preferably so formed that the washer 17 comes in contact with the cap in advance of contact of the edge of the skirt 19 with the cap, so that the edge of the skirt may never come into contact with the cap and may never be distorted thereby. In order to prevent distortion or mutilation of the skirt 19 of the cup leather as the piston reaches its extended position, due to the possibility of the presence of burrs or other projections at the joint between the flange 8 on the cap and the shoulder 6 on the cup, the flange 8 is preferably made with an internal diameter greater than the internal diameter of the shell, so that a recess is formed within the shell below the shoulder 6 and if any burrs or irregularities are present, they will occur in this recess so that they will not contact with the edge of the skirt 19 of the cup leather.

The stem 12 is provided at its upper end with a suitable fitting 21 to receive the conduit through which grease is introduced into the shell under pressure. The introduced grease passes down through the hollow stem 12 into the body of the cup, moving the piston upward. The upward movement of the piston is limited by a shoulder 22 formed approximately at the center of the shell.

The joint between the upper end of the cup and the stem 12 is sealed by a packing 23 of wool felt or other similar material, contained within a packing ring 24. Interposed between the packing ring and the piston is a helical spring 25 which exerts a continuous downward pressure on the piston, tending to eject grease from the shell. The spring 25 surrounds the stem 12 and is spaced therefrom, the lower end of the spring being turned to extend into a hole 26 in the washer 14 and the upper end of the spring being turned to extend into a hole 27 in the ring 24. The spring is thus secured to the piston and to the ring and, since the piston is secured to the stem 12, the ring 24 is yieldingly secured to the stem 12. The edge 28 of the ring 24 is in frictional contact with the end of the shell so that a resistance is applied to its rotation. Rotation of the fitting 21 and consequently rotation of the stem 12, distorts the spring, that is, either winds or unwinds the spring, depending upon the direction of rotation of the fitting 21, and this winding or unwinding progresses until the strain produced in the spring is in excess of the friction between the packing ring and the shell, at which time the packing ring moves. Until this torsional strain limit is reached, the distorted spring will not return the fitting to its original position. The stem is therefore resiliently held in position against rotation but is free to rotate under the application of sufficient force. The spring therefore serves not only the function of exerting a pressure on the grease to eject it from the shell, but also serves to yieldingly and resiliently hold the stem in position against rotation. In order to further increase the resistance of the packing ring 24 to turning, the edge 28 of the ring is provided with a plurality of indentations 31 and the contacting face of the cup is provided with a plurality of buttons or elevations 32 which cooperate with the indentations 31 to increase the force necessary to rotate the ring 24. The indentations 31 are preferably greater in number than the buttons 32, so that, upon the application of a sufficient force, the ring 24 moves in a step-by-step movement.

The grease is ejected from the shell through a hollow tube 34 having a small diameter smooth bore. The tube is preferably provided on its end with a screw head 35 which screws into a seat in the mounting stem 5. The screw head is securely attached to the tube or formed integral therewith and the tube is preferably disposed within the cup.

The resistance offered to the discharge of grease through the tube, other factors being equal, depends upon the length of the tube, or the diameter of the bore of the tube, so that by varying the length or the bore of the tube, the rate at which grease is discharged from the cup may be varied. In some installations, it may be desirable to have a greater rate of feed of grease than in other installations and in such installations a tube 34 of lesser resistance to the flow of grease may be used, that is, a tube of shorter length or of greater bore, although for various reasons I prefer to control the discharge of grease by the use of tubes of the same bore but of varying length. When it is desired to secure the resistance effect of a long tube with a short tube, the inlet end of the tube may be contracted or restricted to increase the resistance to the flow of grease into the tube. The tube 34 is preferably cylindrical in form and has a thin wall and a very smooth bore, so that the rate of discharge is a function of the length of the tube. The tube preferably extends upward into the cup, so that its upper or inlet end is disposed in the active grease zone of the shell, that is, the zone from which grease is displaced by the movement of the piston and into which grease is introduced when a charge of fresh grease is introduced into the shell. This prevents hard dead grease from accumulating around the inlet end of the tube, and insures proper functioning of the device at all times. In the present instance, the tube extends upward into the hollow stem 12. As the cup is charged with grease under pressure, the stem 12 is first filled and the grease then passes around the lower end of the stem into the shell, forcing the piston upward against the shoulder 22 and consequently moving the stem outward to indicate the amount of grease contained within the cup. As the grease is discharged from the shell under the action of the spring, the grease passes upward through the stem 12 and around the tube 34 and into the upper end of the tube. All of the grease in the shell lying above the upper end of the tube is ejected by the piston in its movement to extended position. The stem 12 is never cleared of grease, but a charge of grease remains in the stem when the piston has reached its extended position. The next charge of grease introduced into the shell forces the grease in the stem out of the stem and into the shell, causing such grease to be mixed with the fresh grease and causing a charge of fresh grease to be contained within the stem. Therefore there is never an accumulation of stiff dead grease around the inlet end of the tube 34. Substantially the only dead grease in the shell is that which is contained within the hollow mounting stem 5 and this stem is not necessarily formed with such a large chamber therein, but is so formed in the present instance, since such formation lends itself admirably to manufacturing operation.

The tube also presents other advantageous features which are of peculiar merit in insuring the flow of grease to the bearing. When the journal is working in the bearing, a reduction of pressure is produced in the bearing which tends to draw the grease from the shell. In the ordinary shell having a small outlet orifice opening into a relatively large chamber in the shell, the suction withdraws a small amount of grease from the shell and creates a void directly behind the orifice. With the use of the tube the suction produces a bodily movement of the long cylinder of grease contained within the tube and the introduction of fresh grease into the tube, so that the continual flow of grease to the bearing, while the bearing is working, is insured. In the event that for some reason the grease becomes so viscous that it does not flow to the bearing, as may occur for instance in cold weather, the working of the bearing will produce heat. This heat will be conducted to the tube and will warm a film of grease lying against the surface of the tube, thereby reducing the resistance to the flow of grease and permitting it to discharge from the tube into the bearing.

It is therefore seen that the present grease cup possesses all of the qualities necessary in an automatic grease cup, in that it will always function to discharge grease as long as there is grease contained within the cup and as long as the projection of the stem from the cup indicates that grease is contained within the cup.

I claim:

1. A force feed grease cup comprising a shell having a grease discharge outlet in one end and a circular aperture in the other end, a hollow cylindrical stem extending through said aperture, a packing ring surrounding the stem at the aperture, a piston secured to said stem and disposed within the shell, and a helical spring surrounding the stem and engaging the piston and the ring.

2. A force feed grease cup comprising a shell having a discharge outlet in one end and a circular aperture in the other end, a hollow cylindrical stem extending through said aperture and rotatable therein, a packing ring surrounding the stem at the aperture disposed in frictional engagement with said shell, a piston secured to said stem and disposed within said shell and a helical compression spring surrounding the stem and engaging the ring and the piston, said spring exerting a pressure on the piston to eject grease from the shell and the resisting rotation of the stem.

3. A force feed grease cup comprising a shell having a discharge outlet in one end and a circular aperture in the other end, a hollow cylindrical stem extending through said aperture and rotatable therein, a packing ring surrounding the stem at the aperture having an irregular edge in contact with a complementary irregular surface of the shell, a piston secured to said stem and disposed within the shell, and a compression spring interposed between the ring and the piston and having its ends seated respectively in the ring and piston.

4. In combination with a grease cup, interfitting relatively movable and stationary members, one of which is provided with a fitting to be connected with a filling device, a spring abutting against each of said members, one end of the spring being locked relative to its associated member, and means at the other end of said spring for resisting rotation relative to its associated member at the normal twisting torque occasioned by the connection of the filling device to the fitting.

5. In combination with a grease cup, interfitting relatively movable and stationary members, one of which is provided with a fitting to be connected with a filling device, a spring abutting against each of said members, one end of the spring being locked relative to its associated member, and means at the other end of said spring for resisting rotation relative to its associated member at the normal twisting torque occasioned by the connection of the filling device to the fitting, but allowing relative rotation when an abnormal torque is applied.

In testimony whereof, I have hereunto set my hand.

WILLIAM C. BRINTON, Jr.